G. E. GAY.
SPRING WHEEL.
APPLICATION FILED SEPT. 16, 1913.

1,132,469.

Patented Mar. 16, 1915.

Attest:
Mehrling Stahl
H. L. Alden

Inventor:
Gilbert E. Gay.
By Middleton Donaldson
Attys.

THE NORRIS PETERS CO., PHOTO-LITHO., WASHINGTON, D. C.

UNITED STATES PATENT OFFICE.

GILBERT E. GAY, OF DAMARISCOTTA, MAINE.

SPRING-WHEEL.

1,132,469.   Specification of Letters Patent.   Patented Mar. 16, 1915.

Application filed September 16, 1913.   Serial No. 790,083.

*To all whom it may concern:*

Be it known that I, GILBERT E. GAY, a citizen of the United States, residing at Damariscotta, Maine, have invented certain new and useful Improvements in Spring-Wheels, of which the following is a specification.

My present invention relates to resilient wheels designed more especially for use in connection with motor vehicles.

Among the objects of the invention are to provide a wheel which will avoid the necessity for use of pneumatic tires, the objections to which are well known, while securing a maximum of resilience.

A further object is to provide a wheel in which not only will there be a cushion action in a vertical direction, but also in a direction parallel to the circumference of the wheel whereby a yielding effect on the driving connections will be secured, thus avoiding the shocks and strains due to sudden letting in of the clutch on the starting of the vehicle, and also encountering obstructions in the road.

A still further object is to provide a construction which will be strong, durable and efficient, and yet in which repair or replacement of any broken part may be readily effected without dismantling the whole wheel.

With this and other objects in view, the invention includes the novel features of construction and arrangement and combination of parts hereinafter described and particularly defined by the appended claim.

An embodiment of the invention is illustrated in the accompanying drawing, in which—

Figure 1:
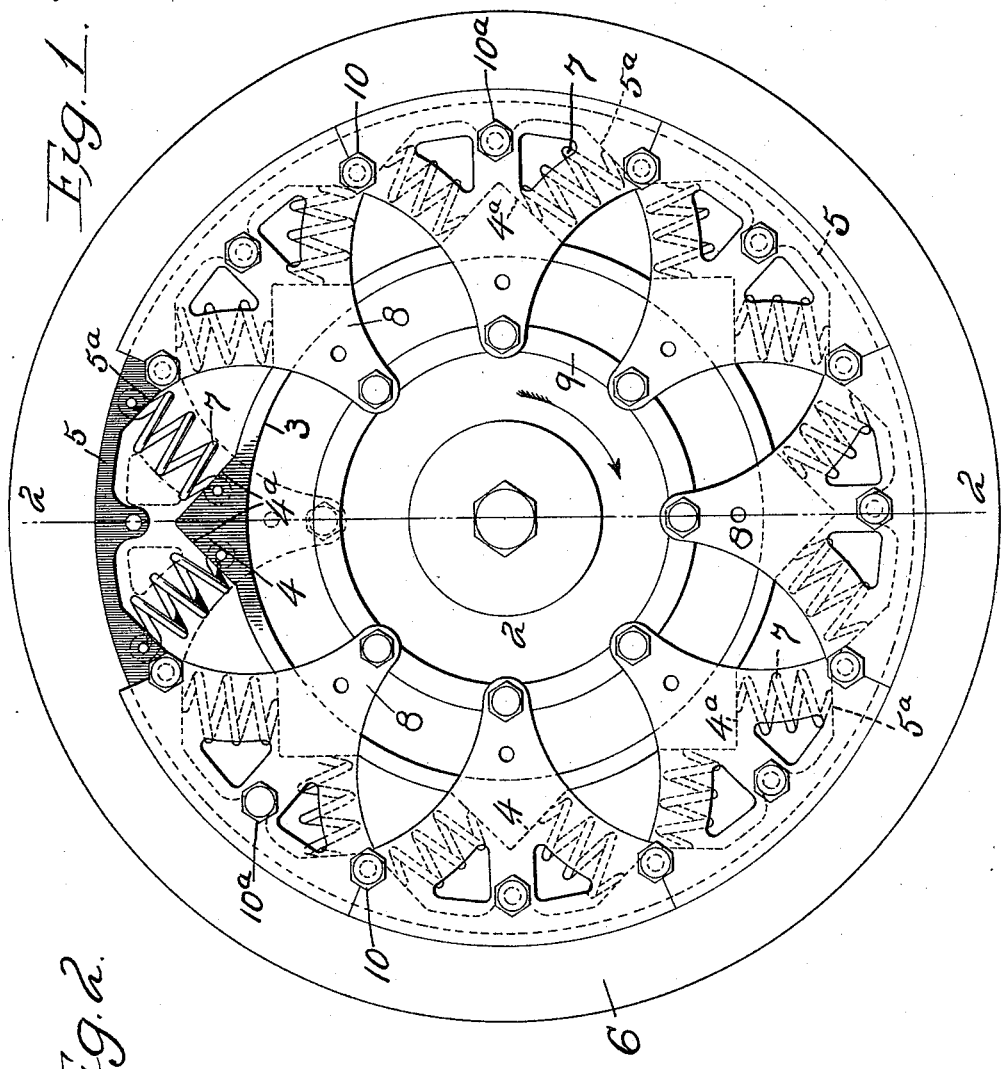
Figure 2:
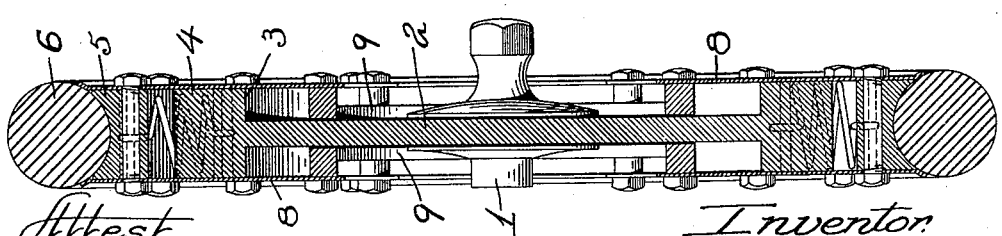

Figure 1 is a side elevation of the wheel constructed in accordance with my invention, with a portion of one of the side plates removed; and Fig. 2 is a section on line 2—2 of Fig. 1.

Referring by reference characters to this drawing, the numeral 1 designates the axle of the vehicle to which the spring wheel is applied, and 2 the inner wheel part of substantially disk form, and adapted to be secured to the axle in any desired manner. This inner wheel part 2 has an enlarged outer rim or flange 3, which is provided at intervals with projections or abutments 4, the faces $4^a$ of which are disposed at right angles to each other. The flange or rim 3 constitutes in effect an inner or rigid wheel rim, while surrounding this and spaced therefrom is an outer wheel rim 5, which is adapted to carry a cushion tread surface 6, which may be of rubber or any desired material, and shaped according to conditions and requirements of load. This outer wheel rim 5 is provided at intervals with inclined abutment faces $5^a$ which are arranged opposite to and parallel with the abutment surfaces $4^a$, and between these abutment surfaces $4^a$ and $5^a$ are arranged helical springs 7. It will be noticed that the abutments of the outer rim are staggered with relation to the abutments of the inner rim, so that the springs incline alternately in opposite directions. Thus the springs not only serve to support the load, but to yieldingly receive the circumferential thrust. Looking at Fig. 1, for example, it will be seen that the two springs directly at the bottom and lying in an inclined position collectively receive the vertical load thrust, and the two adjoining springs the axis of which is in vertical plane also receive the load thrust in the direct line of their axes, while the driving thrust, supposing the wheel to be driven in the direction of the arrow, is received by all of the springs which are inclined in the direction of rotation substantially in line with their axes. This, while giving a cushion drive effect, gives a very strong spring connection.

In order to secure the floating effect necessary between the inner and outer rims, and yet make the wheels sufficiently strong and well braced, I provide on each side a plurality of arch-shaped plates 8, which have their outer edges folded to the side faces of the outer rim, and inwardly projecting portions overlapping the inner rim and having sliding contact therewith, and bolted at their inner extremities to rings 9 which bear against opposite sides of the web or disk 2, and are adapted to slide thereon under the cushioning action of the wheel. These plates, it will be seen, are substantially triangular in shape, and each plate overlaps a pair of diverging springs. I prefer to connect the abutting edges of the plates by a single bolt 10, the head and nut of which overlap the two abutting plates, so that one bolt at this point serves to hold the two plates, thus reducing the number of bolts required, and also deem it advisable to connect the bolts together and at the outer rim by intermediate bolts 10ª passing through the plates and suitable enlargements formed on the outer rim.

By the arrangement of plates and springs described, it will be seen that in case of a breakage of one of the springs it is only necessary to take off one of the plates 8 to give access to the broken spring and enable it to be readily replaced.

The springs may be secured in place in any suitable manner, a convenient means being to sink the ends of the springs in recesses formed in the abutments against which they bear.

Having thus described my invention what I claim is:

A spring wheel comprising an inner portion of disk shape having a peripheral rim, a concentric outer portion having a suitable tread, abutments on said peripheral rim and the inner face of said outer portion staggered in relation to each other, alternately inclined springs located between said abutments, and a plurality of pairs of segmental plates secured to said outer portion each pair of plates inclosing two of the springs between them, and having portions extending inwardly over said peripheral ring, and independent ring-shaped bearing members secured to said inwardly extending portions and bearing against opposite sides of the disk-shaped inner portion, substantially as described.

In testimony whereof I affix my signature in presence of two witnesses.

GILBERT E. GAY.

Witnesses:
GEO. O. KEENE,
AMOS E. OLIVER.

Copies of this patent may be obtained for five cents each, by addressing the "Commissioner of Patents, Washington, D. C."